E. L. CROSBY AND O. J. MARSHICK.
JOURNALED CABLE CLAMP.
APPLICATION FILED OCT. 31, 1919.

1,345,351.

Patented July 6, 1920.

Inventors
Edwin L. Crosby
Oliver J. Marshick
By William M. Swan Attorney

UNITED STATES PATENT OFFICE.

EDWIN L. CROSBY AND OLIVER J. MARSHICK, OF DETROIT, MICHIGAN.

JOURNALED CABLE-CLAMP.

1,345,351.  Specification of Letters Patent.  Patented July 6, 1920.

Application filed October 31, 1919. Serial No. 334,719.

*To all whom it may concern:*

Be it known that we, EDWIN L. CROSBY and OLIVER J. MARSHICK, citizens of the United States, residing at Detroit, county of Wayne, State of Michigan, have invented certain new and useful Improvements in Journaled Cable-Clamps, and declare the following to be a full, clear, and exact description of the same, such as will enable others skilled in the art to which it appertains to make and use the same, reference being had to the accompanying drawings, which form a part of this specification.

This invention relates to means for lessening the bending strain on the flexible cables of a rotatable electric furnace as it moves to and fro about its axis, and has for its object an improved organization of parts by means of which the several cables or insulated wires are held in suitably firm position relatively to their terminal connections on the furnace frame, and yet are subjected to such a gentle curving or bending strain, even when the furnace drum is at the extreme of its swing in either direction, that no damage to the feed wire results.

In the drawings:

Figure 1 is a perspective, showing the wires leading out from the furnace mechanism at about as great a curvature as they are ordinarily likely to be subjected to.

A represents a rotatable furnace drum, from each end of which projects an electrode-handling frame B, on which feed cables C are connected with the electrode which engages in the bearing D. Were these cables allowed to extend out loosely toward their wall or dynamo connections, every time the furnace rocked, the cables would be drawn tighter, resulting in sharply bending each one of them at its point of connection with the electrode block, and thus causing a breaking of the wire sooner or later. We have found it necessary to not only locate the point of bending of the cables at an appreciable distance from their points of connection with the electrode block, but even at that distance to provide an element of greater cushioning qualities than a wire or thin bar for the cables to bend around, this member also serving as a clamp.

Figure 1:
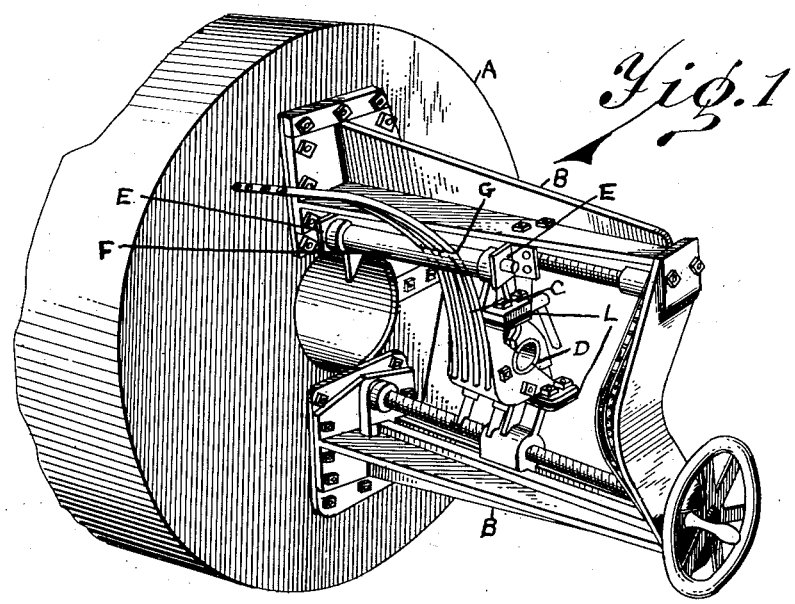
Figure 2:
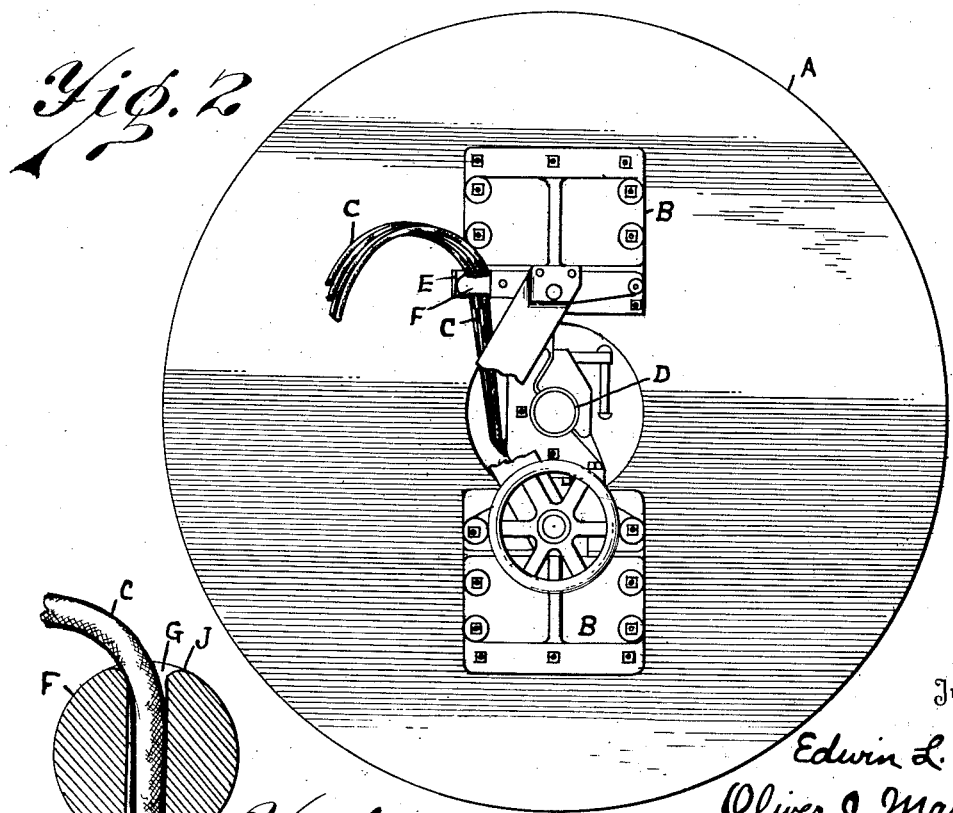
Fig. 2 is an end elevational view.
Figure 3:
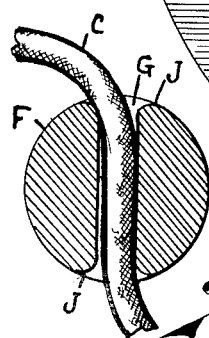
Fig. 3 is an enlarged sectional view of the guide roller, showing the engagement of a cable therethrough.

We therefore journal in brackets E a roller F, through which extend a series of suitably spaced holes G (or if desired, a single lengthwise slot), through which the individual wires or cables pass, the edges or ends of each hole being enlarged or sloped away as at J, so that the curve of a cable thereover, particularly with reference to its relatively remote connections at either end, which are purposely left somewhat loose, is relatively gentle, even when the furnace drum is at the extreme of its swing. In Fig. 3 we have, for the sake of clearness of illustration, shown the cable C as slightly spaced from the sides of the hole or slot G, but when the apparatus is fully ready for use the parts of the roller F serve as a clamp about the cables, to prevent the slack on either side from being drawn tight and thus straining the connections. The roller F, being journaled in the frame B, turns about its axis more or less as the drum rotates, but this, plus the easy curvature of the cables as regards their terminal connections and their tenure against slippage, causes the bending of the cables about so large an arc that the breaking strain on them is reduced to a minimum.

What we claim is:

1. In combination with a rockable frame, a plurality of current wires connected therewith, and a transversely apertured roller member through which said wires lead and by means of which the angular strain on the points of connection of said wires with said frame is lessened when the rocking of the frame takes place.

2. In combination with the electrode frame of a rotatable refractory furnace, an apertured roller member journaled therein substantially parallel to the axis of rotation thereof, and a plurality of cables leading from an external point through the apertures in said roller member to connection with said electrode frame, being so positioned by their engagement with said roller that the strain on their several points of connection due to the rotative movement of said frame is rendered negligible.

3. The combination, with a rocking frame, of a transversely apertured roller journaled therein in parallel relation to the axis of rotation thereof, the apertured portion of said roller being adapted to guide through a path of relatively gentle curvature the several feed cables leading from an external point to connection with said frame.

4. The combination of a rotatable electrode frame, a plurality of feed cables connected therewith, and a guide roller over which said cables extend, adapted to modify the angularity of said cables to their points of connection with the frame when the frame is turned from its normal position.

5. In combination with an electrode frame, a plurality of current wires connected therewith, and a transversely apertured roller journaled in said frame, through which said cables pass and by which the cables are held against slippage and cushioned against undue bending strain.

6. In combination with the electrode frame of a rotatable electric furnace, an electrode carriage member movably supported therein in position to be actuated toward or away from the furnace drum, current cables connected with said carriage member, and a cable-engaging member journaled in said frame in position to turn as the furnace swings, thereby cushioning the bending strain upon said cables.

In testimony whereof we sign this specification in the presence of two witnesses.

EDWIN L. CROSBY.
OLIVER J. MARSHICK.

Witnesses:
  WILLIAM M. SWAN,
  JEFFERSON G. THURBER.